United States Patent
Jung et al.

(10) Patent No.: US 10,797,501 B2
(45) Date of Patent: Oct. 6, 2020

(54) METHOD AND APPARATUS WITH BATTERY CHARGING

(71) Applicant: Samsung Electronics Co., Ltd., Suwon-si (KR)

(72) Inventors: Daeryong Jung, Seoul (KR); Young Hun Sung, Hwaseong-si (KR); Duk Jin Oh, Seoul (KR); Ju Wan Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 16/023,241

(22) Filed: Jun. 29, 2018

(65) Prior Publication Data

US 2019/0190277 A1    Jun. 20, 2019

(30) Foreign Application Priority Data

Dec. 19, 2017    (KR) .......................... 10-2017-0175522

(51) Int. Cl.
*H02J 7/00*      (2006.01)
*H01M 10/44*     (2006.01)
*H01M 10/48*     (2006.01)
*H01M 10/42*     (2006.01)
*B60L 58/22*     (2019.01)

(52) U.S. Cl.
CPC .............. *H02J 7/007* (2013.01); *B60L 58/22* (2019.02); *H01M 10/425* (2013.01); *H01M 10/44* (2013.01); *H01M 10/48* (2013.01); *H02J 7/0047* (2013.01); *H01M 2010/4271* (2013.01)

(58) Field of Classification Search
CPC ....... H02J 7/0091; Y02E 60/12; H01M 10/44; H01M 10/443; Y02B 40/90
See application file for complete search history.

(56) References Cited

U.S. PATENT DOCUMENTS

| | | | |
|---|---|---|---|
| 2003/0057918 A1* | 3/2003 | Aoki | G01R 31/392 320/136 |
| 2003/0076074 A1* | 4/2003 | Kawai | H02J 7/0075 320/136 |
| 2007/0031725 A1* | 2/2007 | Schulze-Beckinghausen | H01M 10/4285 429/65 |
| 2013/0076314 A1* | 3/2013 | Nagakura | H01M 10/44 320/162 |
| 2014/0002031 A1 | 1/2014 | Chaturvedi et al. | |

(Continued)

FOREIGN PATENT DOCUMENTS

| CN | 106786820 A | 5/2017 |
|---|---|---|
| JP | 5492493 B2 | 5/2014 |
| JP | 2017-69011 A | 4/2017 |

(Continued)

*Primary Examiner* — Arun C Williams
(74) *Attorney, Agent, or Firm* — NSIP Law (57) ABSTRACT

A battery charging method and apparatus are provided. The battery charging apparatus determines, in a present charging operation, a variation in a charging current to charge a battery based on a degradation condition of the battery and an internal state of the battery in the present charging operation, and determines a charging current of a subsequent charging operation based on the variation in the charging current in the present charging operation and the charging current in the present charging operation.

21 Claims, 6 Drawing Sheets

(56) References Cited

U.S. PATENT DOCUMENTS

2014/0084856 A1    3/2014  Howard et al.
2015/0147597 A1*   5/2015  Otomo .................... C01B 25/14
                                                    429/7

FOREIGN PATENT DOCUMENTS

KR          10-1502230 B1    3/2015
KR          10-1708345 B1    2/2017
KR      10-2017-0071081 A    6/2017

* cited by examiner

<Linear function>

<Reciprocal function>

<Exponential function>

<Gaussian function>

METHOD AND APPARATUS WITH BATTERY CHARGING

CROSS-REFERENCE TO RELATED APPLICATION

This application claims the benefit under 35 USC § 119(a) of Korean Patent Application No. 10-2017-0175522, filed on Dec. 19, 2017, in the Korean Intellectual Property Office, the entire disclosure of which is incorporated herein by reference for all purposes.

BACKGROUND

1. Field

The following description relates to a method and apparatus with battery charging.

2. Description of Related Art

A battery is used as a power source for various devices and systems such as, for example, mobile devices or electric vehicles, and various schemes or methods for charging a battery have been proposed. For example, a constant current-constant voltage (CC-CV) charging scheme is generally used to charge the battery with a constant current until the battery voltage reaches a predetermined voltage, and to charge the battery with a constant voltage until the battery current reaches a preset low current. In other examples, a multi-step charging scheme, which charges a battery with a constant current in multiple steps from a high current to a low current, and a pulse charging scheme, which repeatedly applies or feeds a charge current to the battery in pulses, with short rest periods between pulses, are used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a battery charging method includes determining, in a present charging operation, a variation in a charging current to charge a battery based on a degradation condition of the battery and an internal state of the battery in the present charging operation; and determining a charging current of a subsequent charging operation based on the determined variation in the charging current in the present charging operation and the charging current in the present charging operation.

The determining of the variation in the charging current comprises determining the variation based on a rate of change of the internal state of the battery in the present charging operation, and a difference between the internal state of the battery and the degradation condition.

The determining of the variation in the charging current further comprises determining the variation to increase in response to the rate of change of the internal state of the battery in the present charging operation increasing.

The determining of the variation in the charging current further comprises determining the variation to decrease in response to the difference between the internal state and the degradation condition increasing.

The determining of the variation in the charging current comprises determining the variation based on a state of charge (SOC) of the battery.

The determining of the variation in the charging current includes in response to the SOC reaching a threshold condition, determining the variation in the charging current based on the internal state of the battery and the degradation condition, and in response to the SOC not reaching the threshold condition, determining the variation in the charging current based on the SOC, the internal state of the battery, and the degradation condition, wherein the variation in the charging current is greater when the SOC has not reached the threshold condition.

The internal state of the battery comprises two or more of an anode overpotential, a cathode overpotential, an anode surface lithium ion concentration, a cathode surface lithium ion concentration, a cell voltage condition, an SOC and a temperature of the battery, and the determining of the variation in the charging current includes determining variations in charging currents for each of a plurality of internal states, and finally determining the variation in the charging current based on the determined variations for each of the plurality of internal states.

The determining of the variation in the charging current includes determining whether a charging limit condition is satisfied during charging of the battery in the present charging operation, and determining the variation in the charging current based on the internal state of the battery and the degradation condition, in response to the charging limit condition being satisfied.

The charging limit condition is a condition to divide charging of the battery into a plurality of charging operations to charge the battery within a range in which a degradation of the battery is prevented.

The internal state of the battery is a factor that controls on the degradation condition of the battery, and the internal state is estimated from one or more of a current, a voltage and a temperature of the battery based on an electrochemical model of the battery.

The electrochemical model is a model to which a degradation factor of the battery is applied.

The degradation factor comprises one or more of an anode surface resistance, a cathode surface resistance, a reduction in an anode active material and a reduction in a cathode active material.

The battery is charged with the charging current of the subsequent charging operation.

The battery charging method includes determining whether one or more of a charging time, a current, a voltage, a temperature and the internal state of the battery reaches a charging termination condition, and terminating charging of the battery in response to the charging termination condition being satisfied.

According to another general aspect, a battery charging apparatus includes a processor, and a memory configured to store at least one instruction that is executable by the processor, wherein in response to the at least one instruction being executed by the processor, the processor is configured to determine, in a present charging operation, a variation in a charging current to charge a battery based on a degradation condition of the battery and an internal state of the battery in the present charging operation, and configured to determine a charging current of a subsequent charging operation based on the variation in the charging current in the present charging operation and the charging current in the present charging operation.

The processor is configured to determine the variation in the charging current based on a rate of change of the internal state of the battery in the present charging operation, and a difference between the internal state of the battery and the degradation condition.

The processor is further configured to determine the variation in the charging current based on a state of charge (SOC) of the battery.

The internal state of the battery comprises any two or any combination of an anode overpotential, a cathode overpotential, an anode surface lithium ion concentration, a cathode surface lithium ion concentration, a cell voltage condition, an SOC and a temperature of the battery, and the processor is configured to determine variations in charging currents for each of a plurality of internal states, and to finally determine the variation in the charging current based on the determined variations for each of the plurality of internal states.

The processor is configured to determine whether a charging limit condition is satisfied during charging of the battery in the present charging operation, and configured to determine the variation in the charging current based on the internal state of the battery and the degradation condition, in response to the charging limit condition being satisfied.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions are exemplary to merely describe the examples, and the scope of the examples is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined herein, all terms used herein including technical or scientific terms have the same meanings as those generally understood by one of ordinary skill in the art with respect to the disclosure of the present application. Terms defined in dictionaries generally used should be construed to have meanings matching with contextual meanings in the related art and the present application and are not to be construed as an ideal or excessively formal meaning unless otherwise defined herein.

Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

Figure 1:
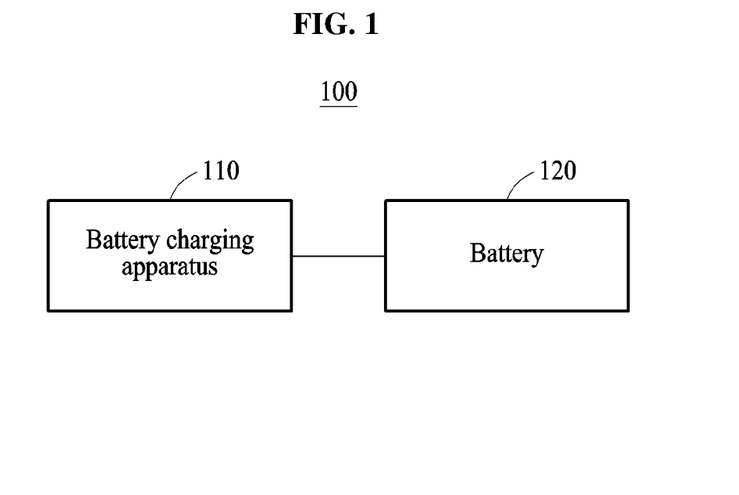
FIG. 1 illustrates an example of a battery system.

FIG. 1 illustrates an example of a battery system 100.

Referring to FIG. 1, the battery system 100 includes a battery charging apparatus 110 and a battery 120, but is not limited to these components.

The battery 120 may be, for example, a battery cell, a battery module or a battery pack. The battery 120 may include a charger or a secondary cell configured to store power by receiving a charge, and a device that includes the battery 120 may receive the power from the battery 120, and apply the received power to a load.

The battery charging apparatus 110 is implemented by, for example, a battery management system (BMS). The BMS is a system configured to manage the battery 120, and performs, for example, any one or any combination of an operation of monitoring a state of charge (SOC) or a state of health (SOH) of the battery 120, an operation of maintaining an optimized condition of the battery 120, an operation of predicting a replacement timing of the battery 120 based on a determination of the lifespan of the battery 120, an operation of detecting a fault of the battery 120, and an operation of generating a control signal or a command signal associated with the battery 120 to control a state or operation of the battery 120.

The battery charging apparatus 110 determines a charging current to charge the battery 120 for each charging operation or step. The battery charging apparatus 110 determines a variation in the charging current based on a degradation condition and an internal state of the battery 120 in a present charging operation or step, and reduces an amount of the charging current by the determined variation, to determine a charging current that is to be used for charging the battery in a subsequent charging operation.

In an example, a charging current is variously expressed in amperes (A) or milliamperes (mA). Also, the charging current is expressed by a c-rate. The c-rate is a battery-related characteristic indicating a rate of current for charging and discharging of a battery based on a capacity of the battery, and a unit of "C" is typically used. For example, when a battery has a capacity of 1,000 milliampere hour (mAh) that corresponds to an amount of current to be used, or that the battery is capable of holding, for 1 hour, and when current for charging and discharging is 1 A, the c-rate is "1 C=1 A/1,000 mAh."

Hereinafter, an example of an operation of the battery charging apparatus 110 will be further described with reference to the drawings.

Figure 2:
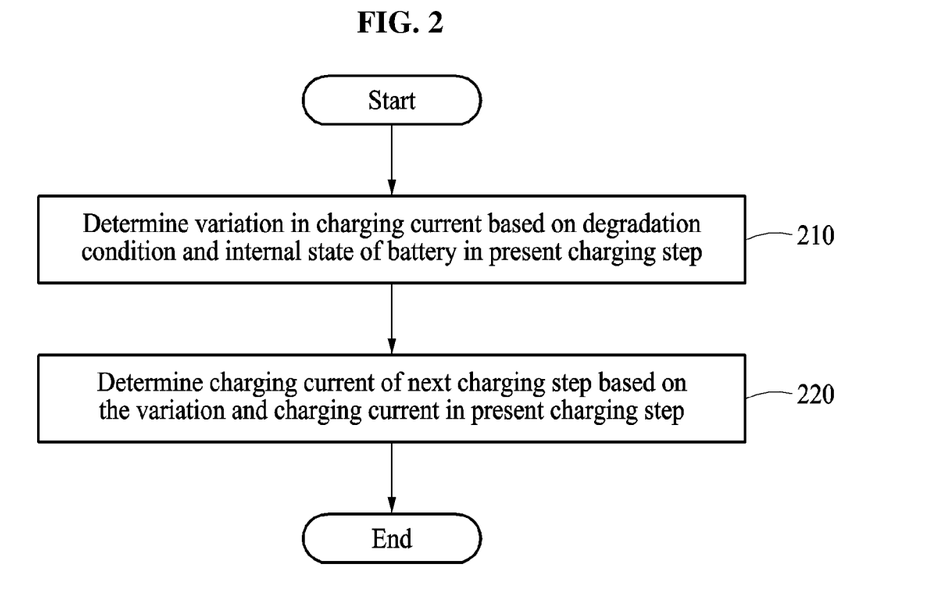
FIG. 2 is a flowchart illustrating an example of a battery charging method.

FIG. 2 is a flowchart illustrating an example of a battery charging method.

The battery charging method of FIG. 2 is performed by, for example, one or more processors of a battery charging apparatus. The battery charging apparatus charges a battery using a multi-step charging scheme with charging currents in multiple steps. As a non-limiting example, in the discussions that follow, the battery and the battery charging apparatus may correspond to the battery charging apparatus 110 and the battery 120 of FIG. 1.

Referring to FIGS. 1 and 2, in the example depicted, in operation 210, the battery charging apparatus 110 determines a variation in a charging current based on a degradation condition and an internal state of a battery 120 in a present charging step.

The internal state is a factor that has an influence on a degradation state of a battery 120, and is estimated from any one or any combination of a voltage, a current and a temperature of the battery based on an electrochemical model of the battery. The internal state includes, for example, any one or any combination of an anode overpotential, a cathode overpotential, an anode surface lithium ion concentration, a cathode surface lithium ion concentration, a cell voltage condition, a state of charge (SOC), a state of health (SOH), and an internal temperature of the battery.

An overpotential is a voltage drop due to a deviation from an equilibrium potential associated with intercalation or de-intercalation reactions at each electrode of a battery. Also, a lithium ion concentration is a concentration of lithium ions (Li+) used as a material in an active material of each electrode of a battery, and materials other than the lithium ions are used as materials in the active material.

The SOC is a parameter indicating an amount of charge in a battery, or the level of charge remaining in the battery. The SOC indicates a level of energy stored in a battery and an amount of the SOC may be expressed as 0 to 100% using a percentage unit. For example, 0% indicates a fully discharged state and 100% indicates a fully charged state, which is variously modified and defined depending on a design intent or examples. Various schemes may be employed to estimate or measure the SOC.

To express an internal state of a battery, an electrochemical model may be employed using various schemes or methods. For example, various application models as well as a single particle model (SPM) are employed as electrochemical models. Also, parameters that define an electrochemical model are variously modified depending on a design intent.

For example, a degradation factor of a battery is applied to an electrochemical model that is utilized to estimate an initial state of the battery. The degradation factor of the battery is a factor indicating a degradation level of the battery, and includes, for example, any one or any combination of an anode surface resistance, a cathode surface resistance, a reduction in an anode active material and a reduction in a cathode active material.

The battery charging apparatus estimates a state of health (SOH) of the battery, acquires a degradation factor of the battery based on the estimated SOH, and applies the acquired degradation factor to an electrochemical model. The SOH is a parameter that quantitatively represents a change in a life characteristic of the battery due to an aging effect (for example, a degradation phenomenon), and may indicate the amount of charge that the battery is capable of holding. The SOH indicates, for example, a degree of degradation in a lifespan or capacity of the battery. Various schemes for estimating or measuring an SOH are employed. In response to the degradation level of the battery being reflected, parameters of the electrochemical model are modified.

In operation 220, the battery charging apparatus 110 determines a charging current of a subsequent charging step based on the variation in the charging current (based on the degradation condition and the internal state of the battery in the present charging step) and the charging current in the present charging step. For example, the battery charging apparatus determines a charging current reduced by the variation from the charging current of the present charging step, as a charging current of the next charging step.

Figure 3:
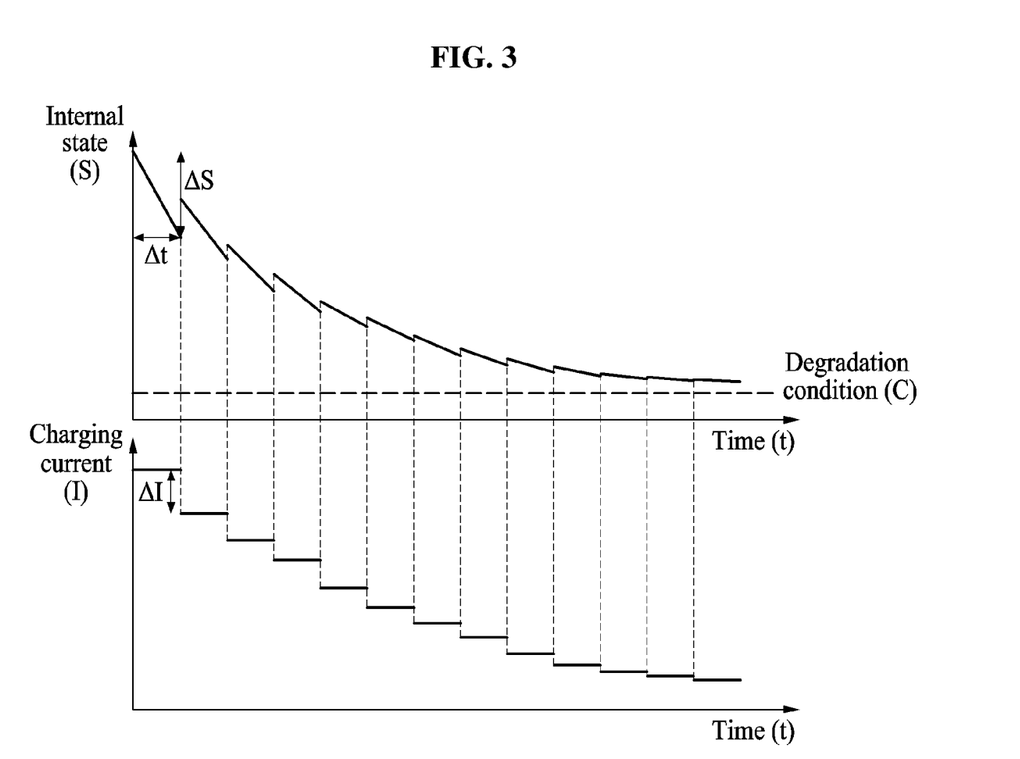
FIG. 3 and FIG. 4 illustrate an example of a process of determining a charging current.

FIG. 3 illustrates an example of a process of determining a charging current of a battery.

FIG. 3 illustrates charging currents and internal states for each charging step.

Referring to FIGS. 1 and 3, in the example depicted, a battery charging apparatus 110 charges a battery 120 based on a multi-step charging scheme with charging currents in multiple steps. For example, the battery charging apparatus 110 charges a battery 120 with a charging current corresponding to a constant current (CC) during a single charging step. Also, the battery charging apparatus 110 reduces an amount of a charging current of a present charging step by a variation in the charging current, and charges the battery 120 in a subsequent charging step based on the reduced charging current.

An internal state of the battery 120 changes during charging of the battery 120. For example, when the internal state of the battery reaches a degradation condition, the battery is degraded. The degradation condition is a condition related to the internal state in which the battery 120 is degraded. For example, when an anode overpotential of the battery 120 is reduced to 0.01 volts (V) or less, the battery 120 is determined to be degraded. In this example, when an anode overpotential of 0.01 V is set as a degradation condition for a degradation of the battery in response to the anode overpotential reaching 0.01V. The degradation condition is experimentally or heuristically derived, or is derived from an electrochemical model of the battery 120, however, a scheme of setting the degradation condition is not limited thereto.

As shown in the example of FIG. 3, a charging current remains unchanged although the internal state of the battery 120 changes during a single charging step. Charging currents are determined for each of the charging steps. The battery charging apparatus 110 determines a variation in a charging current based on a degradation condition and an internal state of the battery 120 in a present charging step, and determines a charging current of a subsequent charging step based on the determined variation in the charging current (based on the degradation condition and the internal state of the battery in the present charging step) and the charging current in the present charging step.

The variation in the charging current is determined based on a rate of change of the internal state of the battery in the present charging step and a difference between the internal state of the battery and the degradation condition. For example, the variation is determined using Equation 1 shown below.

$$\frac{|S - C|}{\Delta S / \Delta t} = A$$

$$f(A) = \Delta I$$

Equation 1

In Equation 1, S denotes an internal state of a battery, C indicates a degradation condition, $\Delta S$ denotes a variation in the internal state during a single charging step, $\Delta t$ denotes a charging time of a single charging step, f( ) denotes a transformation function, and $\Delta I$ denotes a variation in a charging current.

The rate of change of the internal state of the battery is determined based on a variation in the internal state during a single charging step and a charging time of the charging step. Also, the difference between the internal state and the degradation condition is determined. In this example, the internal state may have various values, for example, a minimum value, a maximum value and an average value of the internal state in a single charging step.

As shown in Equation 1 above, a parameter A is determined based on the rate of change of the internal state and the difference between the internal state and the degradation condition, and a variation in the charging current is determined from the parameter A using a transformation function.

Figure 4:
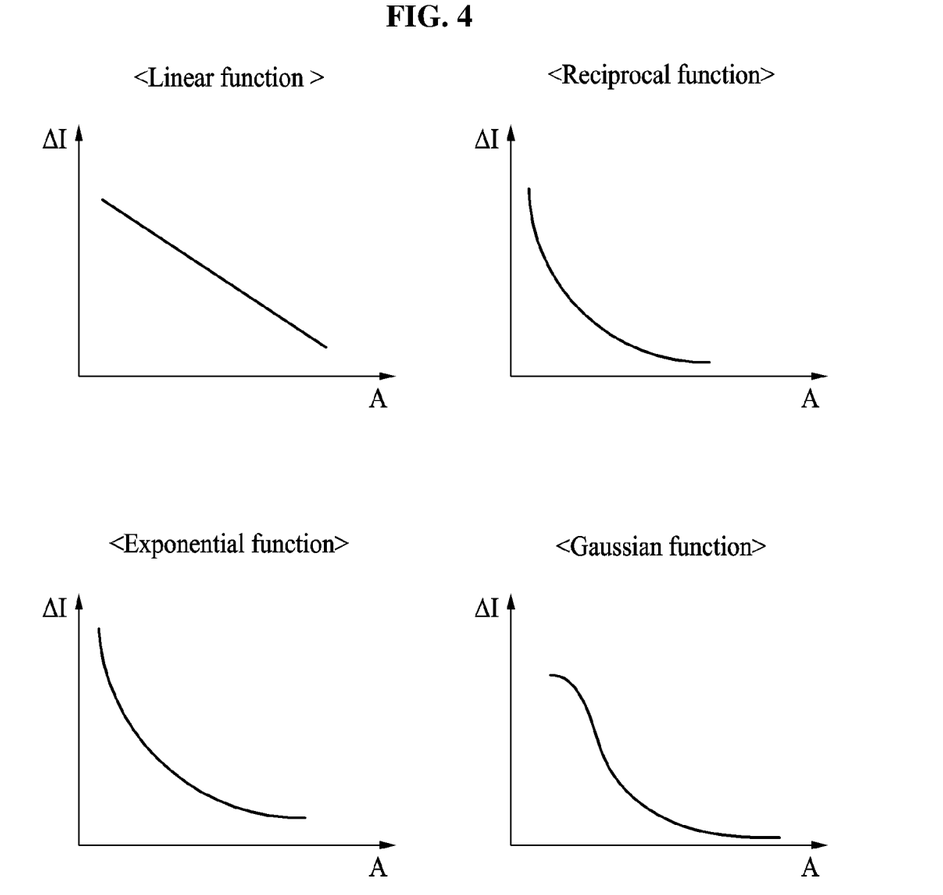

The transformation function is a function in which a variation in a charging current increases as the parameter A decreases, and includes, for example, a linear function, a reciprocal function, an exponential function and a Gaussian function as shown in FIG. 4. However, examples of the transformation function are not limited thereto, and are applicable to any function in which a variation in a charging current increases as a parameter A decreases in Equation 2 below.

$$f(A) = 0.2 + e^{-A/1000} = \Delta I$$

Equation 2

Due to the transformation function, the variation in the charging current is determined to increase when the rate of change of the internal state increases. For example, a relatively high rate of change of the internal state of the battery indicates that the internal state of the battery is quickly approaching the degradation condition. In this example, a degradation of the battery may be inhibited by increasing the variation in the charging current.

In an example, the variation in the charging current decreases when the difference between the internal state of the battery and the degradation condition increases. A large difference between the internal state of the battery and the degradation condition may indicate that a present internal state of the battery is considerably different from the degradation condition. The variation in the charging current does not necessarily have to be increased to prevent a degradation of the battery.

For example, when the difference between the internal state of the battery and the degradation condition decreases, and when the rate of change of the internal state of the battery increases, the variation in the charging current is determined to increase. Thus, the internal state is allowed to slowly reach the degradation condition.

Thus, a charging waveform in which, when a degradation condition is quickly satisfied due to a charging current of a present charging step, a charging current of a subsequent charging step decreases substantially, is induced. In an example, if there is a slow rate of change of an internal state of a battery when the internal state approaches a degradation condition, the battery 120 is stably charged. The battery charging apparatus 110 determines charging currents for each charging step within a range in which the internal state does not reach the degradation condition using the above-described method, to efficiently charge the battery.

Figure 5:
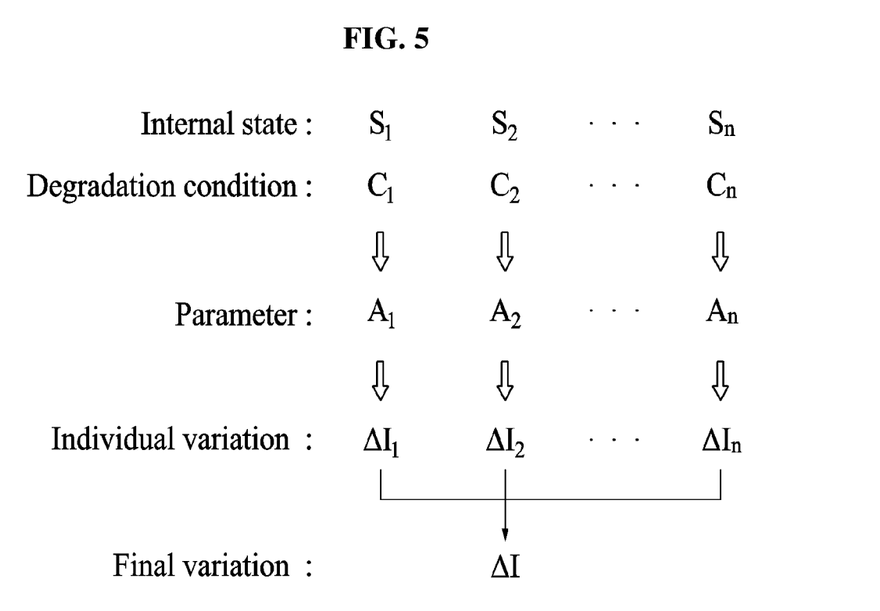
FIG. 5 illustrates an example of a process of determining a variation in a charging current based on a plurality of internal states.

FIG. 5 illustrates an example of a process of determining a variation in a charging current based on a plurality of internal states of a battery.

Referring to FIGS. 1 and 5, in the example depicted, a battery charging apparatus 110 determines a variation in a charging current based on a plurality of internal states of the battery 120, for example, internal states $S_1$ through $S_n$. Degradation conditions $C_1$ through $C_n$ respectively corresponding to the internal states $S_1$ through $S_n$ are set, and parameters $A_1$ through $A_n$ respectively corresponding to the internal states $S_1$ through $S_n$ are set based on the internal states $S_1$ through $S_n$ and degradation conditions $C_1$ through $C_n$, respectively. Also, on the basis of a transformation function, individual variations $\Delta I_1$ through $\Delta I_n$ in charging currents are determined from the parameters $A_1$ through $A_n$, respectively.

The battery charging apparatus 110 determines a final variation $\Delta I$ in a charging current based on the individual variations $\Delta I_1$ through $\Delta I_n$ respectively corresponding to the internal states $S_1$ through $S_n$. For example, the battery charging apparatus 110 determines any one or any combination of a maximum value, a minimum value and an average value of the individual variations $\Delta I_1$ through $\Delta I_n$ as the final variation $\Delta I$. Also, various methods may be used to determine the final variation $\Delta I$ based on the individual variations $\Delta I_1$ through $\Delta I_n$.

As described above, the battery charging apparatus determines the final variation $\Delta I$ based on the internal states $S_1$ through $S_n$, and thus it is possible to effectively inhibit a degradation in the battery based on all various internal states.

Figure 6:
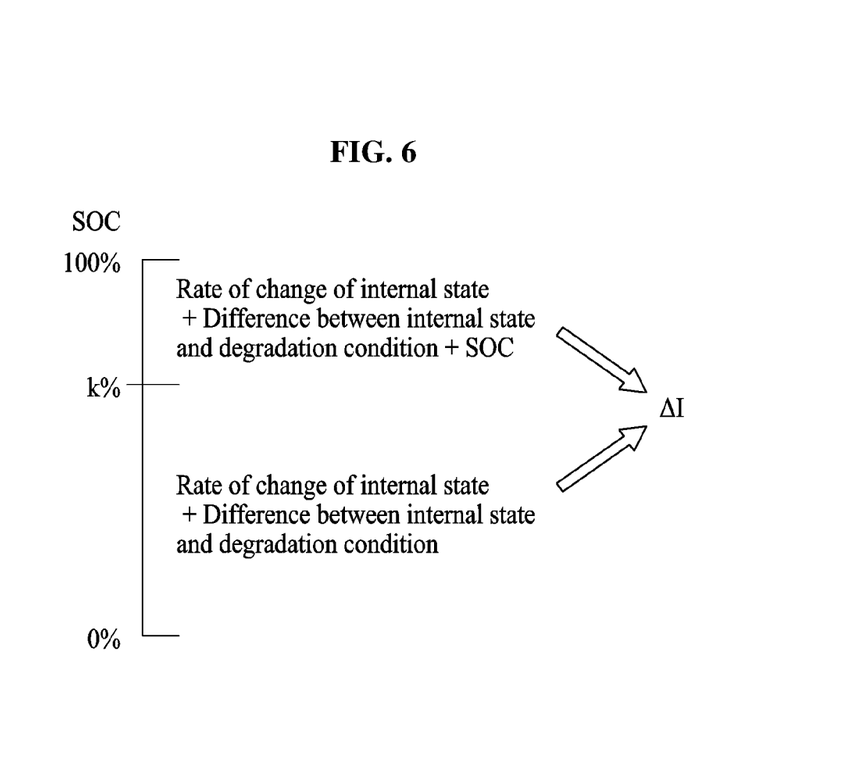
FIG. 6 illustrates an example of a process of determining a variation in a charging current based on a state of charge (SOC) of a battery.

FIG. 6 illustrates an example of a process of determining a variation in a charging current based on an SOC of a battery.

Referring to FIGS. 1 and 6, in the example depicted, a battery charging apparatus 110 determines a variation in a charging current by selectively using an SOC of a battery 120. In general, when a battery 120 is charged with a relatively high current when the battery 120 is in a relatively high SOC, a probability of a degradation in the battery is relatively high. Thus, it would be beneficial to prevent a battery from being charged with a relatively high current when the battery is in a relatively high SOC state.

In an example, the battery charging apparatus 110 determines whether the SOC of the battery 120 reaches a threshold condition (for example, an SOC less than or equal to k %). For example, when the SOC reaches the threshold condition, the battery charging apparatus 110 determines a variation in a charging current based on a degradation condition and an internal state of the battery 120, regardless of the SOC, as described above.

In another example, when the SOC does not reach the threshold condition, the battery charging apparatus 110 determines a variation in a charging current based on the SOC in addition to the degradation condition and the internal state of the battery 120. In this example, the battery charging apparatus 110 determines the variation to be greater than a variation in a charging current that is determined based on the degradation condition and the internal state of the battery, regardless of the SOC. Additionally, when the SOC increases, the battery charging apparatus 110 determines the variation in the charging current to increase.

An example of determining a variation in a charging current when the SOC does not reach the threshold condition is expressed using Equation 3 shown below.

$$f(A, SOC) = \Delta I \qquad \text{Equation 3}$$

In Equation 3, SOC denotes an SOC of a battery.

Figure 7:
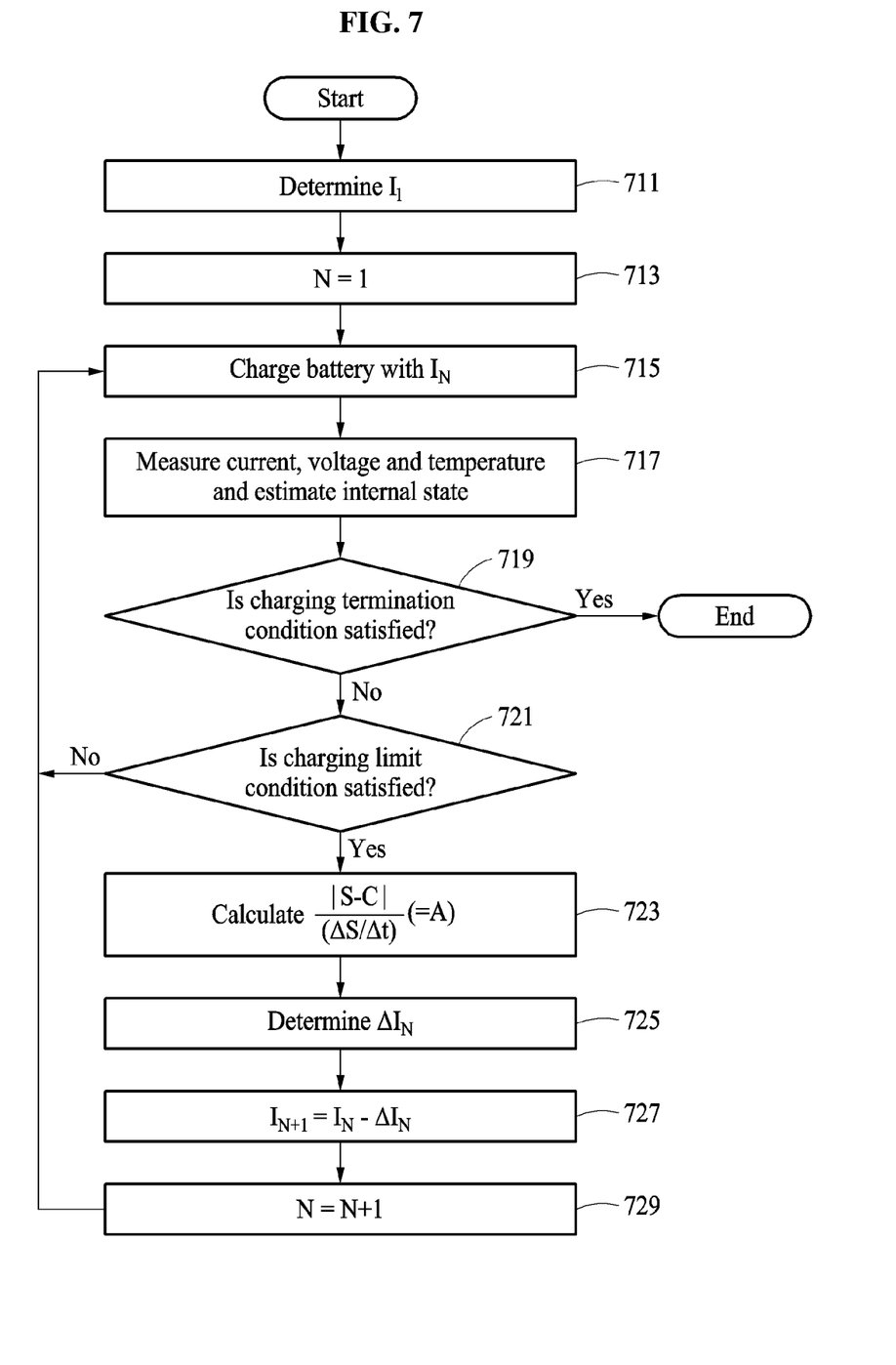
FIG. 7 is a flowchart illustrating an example of a battery charging method.

FIG. 7 is a flowchart illustrating an example of a battery charging method. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, may be implemented by a special purpose hardware-based computer that performs the specified functions, or combinations of special purpose hardware and computer instructions. In addition to the description of FIG. 7 below, the descriptions of FIG. 1 are also applicable to FIG. 7, and are incorporated herein by reference. Thus, the above description may not be repeated here.

The battery charging method of FIG. 7 is performed by, for example, one or more processors of a battery charging apparatus.

Referring to the example depicted in FIG. 7, in operation 711, the battery charging apparatus 110 determines an initial charging current $I_1$. As a non-limiting example, the initial charging current $I_1$ is experimentally or heuristically determined by a battery cell manufacturer or a user of a battery, and a scheme of determining the initial charging current $I_1$ is not limited thereto.

In operation 713, the battery charging apparatus sets a charging step to "1."

In operation 715, the battery charging apparatus charges a battery with a charging current $I_N$ that corresponds to a CC.

In operation 717, the battery charging apparatus 110 measures any one or any combination of a current, a voltage and a temperature of the battery, and estimates an internal state of the battery based on a measured value and an electrochemical model, during a charging process of the battery.

In operation 719, the battery charging apparatus 110 determines whether a charging termination condition is satisfied. The charging termination condition is a condition to terminate charging of the battery 120. For example, a charging termination condition is set for any one or any combination of a charging time, a current, a voltage, a temperature and an internal state of the battery 120. The battery charging apparatus 110 determines whether a value obtained by measuring the charging time, the current, the voltage or the temperature, and/or a value obtained by estimating the internal state of the battery reaches the charging termination condition.

In an example, the battery charging apparatus 110 determines whether a charging time of the battery 120 reaches a charging termination condition (for example, a charging time longer than or equal to 1 hour). In another example, the battery charging apparatus 110 determines whether an SOC of the battery 120 reaches a charging termination condition (for example, an SOC greater than or equal to 95%). In still another example, the battery charging apparatus 110 determines whether each of the charging time and the SOC of the battery 120 reaches a charging termination condition.

When the charging termination condition is not satisfied, the battery charging apparatus 110 determines whether a charging limit condition is satisfied in operation 721. The charging limit condition is a condition to divide charging of the battery 120 into a plurality of charging steps to charge the battery 120 within a range to prevent a degradation of the battery. For example, a charging limit condition for any one or any combination of a charging time, a current, a voltage, a temperature and an internal state of the battery is set. The battery charging apparatus 110 determines whether a value obtained by measuring the charging time, the current, the voltage or the temperature, and/or a value obtained by estimating the internal state of the battery reaches the charging limit condition.

In an example, the battery charging apparatus 110 determines whether a charging time of the battery 120 reaches a charging limit condition (for example, a charging time longer than or equal to 8 minutes). In another example, the battery charging apparatus 110 determines whether a variation in the internal state of the battery 120 reaches a charging limit condition (for example, a variation higher than or equal to 0.1 V). In still another example, the battery charging apparatus 110 determines whether each of the charging time and the variation in the internal state reaches a charging limit condition.

When the charging limit condition is not satisfied, operations 715 through 721 are reperformed.

When the charging limit condition is satisfied, the battery charging apparatus 110 calculates a parameter A based on a rate of change of the internal state of the battery in a corresponding charging step and a difference between the internal state of the battery and the degradation condition in operation 723.

In operation 725, the battery charging apparatus 110 determines a variation in a charging current (for example, indicated by $\Delta I_N$) from the parameter A using a transformation function. The transformation function is a function in which a variation in a charging current increases as the parameter A decreases, and includes, for example, a linear function, a reciprocal function, an exponential function and a Gaussian function.

In operation 727, the battery charging apparatus 110 reduces a charging current of a corresponding charging step by the variation determined in operation 725, to determine a charging current of a subsequent charging step.

In operation 729, the battery charging apparatus 110 increments a charging step by "1." In operation 715, the battery charging apparatus 110 charges the battery 120 with the charging current determined in operation 727.

When the charging termination condition is satisfied in operation 719, the battery charging method of FIG. 7 is terminated.

Figure 8:
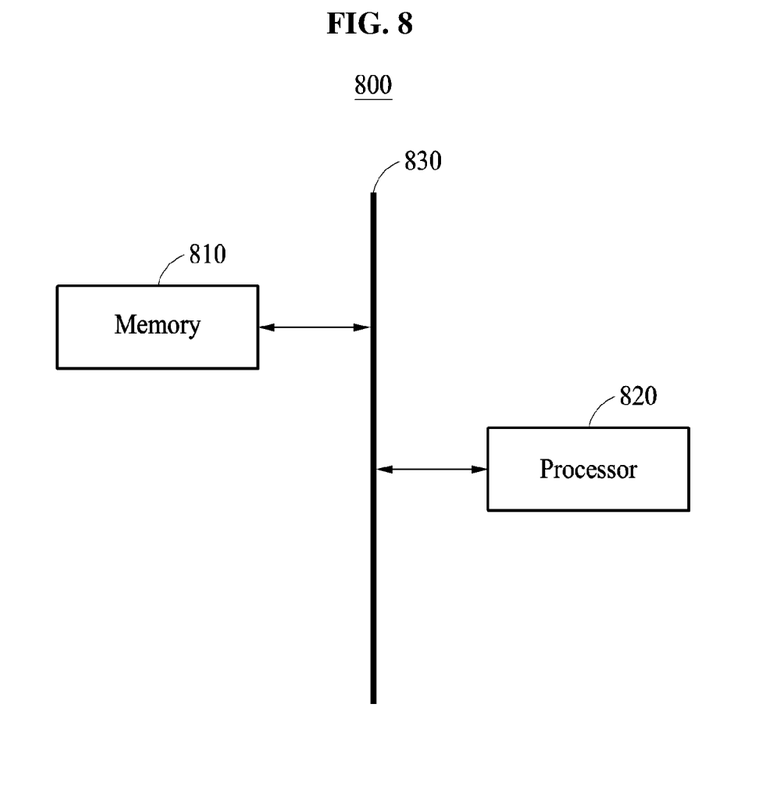
FIG. 8 illustrates an example of a battery charging apparatus.

FIG. 8 illustrates an example of a battery charging apparatus 800.

Referring to FIG. 8, as a non-limiting example, the battery charging apparatus 800 includes a memory 810 and a processor 820. The memory 810 and the processor 820 communicate with each other via a bus 830. Although only a single memory 810 and a single processor 820 are illustrated in FIG. 8, this is only an example. The battery charging apparatus 800 may include one or more memories 810, and one or more processors 820.

The memory 810 stores a computer-readable instruction. The processor 820 performs the above-described operations in response to the instruction in the memory 810 being executed by the processor 820. The memory 810 is, for example, a volatile memory or a non-volatile memory.

The processor 820 includes an apparatus configured to execute instructions or programs or to control the battery charging apparatus 800. The processor 820 determines a variation in a charging current to charge a battery based on a degradation condition of the battery and an internal state of the battery in a present charging step, and determines a charging current of a subsequent charging step based on the variation in the charging current (based on the degradation condition and the internal state of the battery in the present charging step) and the charging current in the present charging step.

As a non-limiting example, the battery charging apparatus 800 is included in, for example, various electronic devices (for example, an electric vehicle, a walking assistance apparatus, a drone, or a mobile terminal) that use a battery as a power source, and performs the operations described above with reference to FIGS. 1 through 7. Hereinafter, an example in which the battery charging apparatus 800 is included in an electric vehicle is described with reference to FIG. 9.

Figure 9:
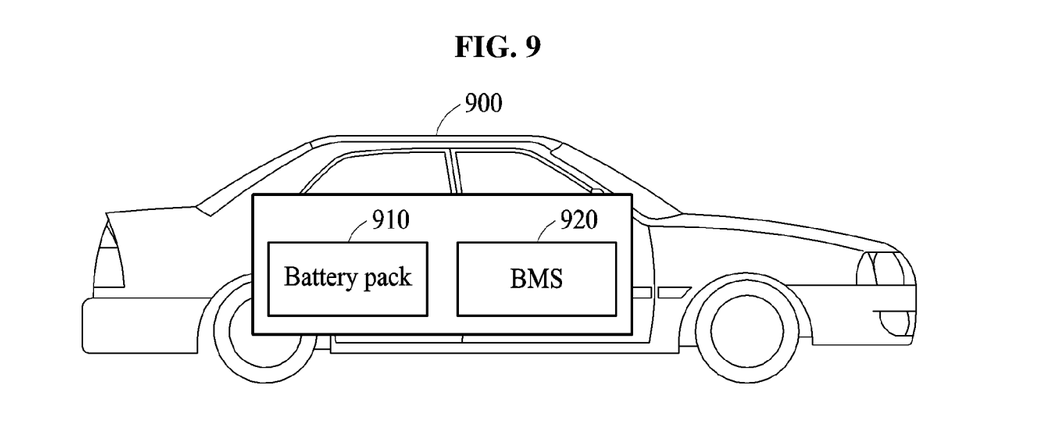
FIG. 9 illustrates an example of a vehicle with battery charging.

FIG. 9 illustrates an example of a vehicle 900.

Referring to FIG. 9, in the example depicted, the vehicle 900 includes a battery pack 910 and a BMS 920. The vehicle 900 may use the battery pack 910 as a power source. As a non-limiting example, the vehicle 900 may be, for example, an electric vehicle (EV) or a hybrid vehicle.

The battery pack 910 includes at least one battery module. The battery module includes at least one battery cell.

The BMS 920 monitors whether an abnormality occurs in the battery pack 910, and may prevent the battery pack 910 from being overcharged or over-discharged. Also, the BMS 920 performs a thermal control on the battery pack 910 when a temperature of the battery pack 910 exceeds a first temperature (for example, 40° C.) or is less than a second temperature (for example, −10° C.). Furthermore, the BMS 920 performs cell balancing to equalize SOCs of battery cells included in the battery pack 910.

For example, the BMS 920 includes a battery charging apparatus. The BMS 920 determines, using the battery charging apparatus, a variation in a charging current to charge a battery based on a degradation condition and an internal state of the battery in a present charging step, to determine a charging current of a subsequent charging step.

The above description of FIGS. 1 through 8 is also applicable to the example of FIG. 9, and accordingly is not repeated here.

The battery system 100, the battery charging apparatus 800, the BMS 920 and other apparatuses, units, modules, devices, and other components described herein with respect to FIGS. 1, 3 through 6, 8 and 9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 and 7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery charging method comprising:
   determining, in a present charging operation, a variation in a charging current to charge a battery based on a degradation condition of the battery and an internal state of the battery in the present charging operation; and
   determining a charging current of a subsequent charging operation based on the determined variation in the charging current in the present charging operation and the charging current in the present charging operation,
   wherein the internal state of the battery comprises at least one of an anode overpotential, a cathode overpotential, an anode surface lithium ion concentration, a cathode surface lithium ion concentration, a cell voltage condition, an SOC and a temperature of the battery.

2. The battery charging method of claim 1, wherein the determining of the variation in the charging current comprises determining the variation based on a rate of change of the internal state of the battery in the present charging operation, and a difference between the internal state of the battery and the degradation condition.

3. The battery charging method of claim 2, wherein the determining of the variation in the charging current further comprises determining the variation to increase in response to the rate of change of the internal state of the battery in the present charging operation increasing.

4. The battery charging method of claim 2, wherein the determining of the variation in the charging current further comprises determining the variation to decrease in response to the difference between the internal state and the degradation condition increasing.

5. The battery charging method of claim 1, wherein the determining of the variation in the charging current comprises determining the variation based on a state of charge (SOC) of the battery.

6. The battery charging method of claim 5, wherein the determining of the variation in the charging current comprises:
   in response to the SOC reaching a threshold condition, determining the variation in the charging current based on the internal state of the battery and the degradation condition; and
   in response to the SOC not reaching the threshold condition, determining the variation in the charging current based on the SOC, the internal state of the battery, and the degradation condition, wherein the variation in the charging current is greater when the SOC has not reached the threshold condition.

7. The battery charging method of claim 1, wherein the determining of the variation in the charging current comprises:
   determining variations in charging currents for each of a plurality of internal states; and
   finally determining the variation in the charging current based on the determined variations for each of the plurality of internal states.

8. The battery charging method of claim 1, wherein the determining of the variation in the charging current comprises:
   determining whether a charging limit condition is satisfied during charging of the battery in the present charging operation; and
   determining the variation in the charging current based on the internal state of the battery and the degradation condition, in response to the charging limit condition being satisfied.

9. The battery charging method of claim 8, wherein the charging limit condition is a condition to divide charging of the battery into a plurality of charging operations to charge the battery within a range in which a degradation of the battery is prevented.

10. The battery charging method of claim 1, wherein the internal state of the battery is a factor that controls on the degradation condition of the battery, and the internal state is estimated from one or more of a current, a voltage and a temperature of the battery based on an electrochemical model of the battery.

11. The battery charging method of claim 10, wherein the electrochemical model is a model to which a degradation factor of the battery is applied.

12. The battery charging method of claim 11, wherein the degradation factor comprises one or more of an anode surface resistance, a cathode surface resistance, a reduction in an anode active material and a reduction in a cathode active material.

13. The battery charging method of claim 1, further comprising:
   charging the battery with the charging current of the subsequent charging operation.

14. The battery charging method of claim 1, further comprising:
   determining whether one or more of a charging time, a current, a voltage, a temperature and the internal state of the battery reaches a charging termination condition; and
   terminating charging of the battery in response to the charging termination condition being satisfied.

15. A non-transitory computer-readable storage medium storing instructions that, when executed by a processor, cause the processor to perform the method of claim 1.

16. A battery charging apparatus comprising:
   a processor; and
   a memory configured to store at least one instruction that is executable by the processor,
   wherein in response to the at least one instruction being executed by the processor, the processor is configured to determine, in a present charging operation, a variation in a charging current to charge a battery based on a degradation condition of the battery and an internal state of the battery in the present charging operation, and configured to determine a charging current of a subsequent charging operation based on the variation in the charging current in the present charging operation and the charging current in the present charging operation, and
   wherein the internal state of the battery comprises at least one of an anode overpotential, a cathode overpotential, an anode surface lithium ion concentration, a cathode surface lithium ion concentration, a cell voltage condition, an SOC and a temperature of the battery.

17. The battery charging apparatus of claim 16, wherein the processor is configured to determine the variation in the charging current based on a rate of change of the internal state of the battery in the present charging operation, and a difference between the internal state of the battery and the degradation condition.

18. The battery charging apparatus of claim 16, wherein the processor is further configured to determine the variation in the charging current based on a state of charge (SOC) of the battery.

19. The battery charging apparatus of claim 16, wherein the processor is configured to determine variations in charging currents for each of a plurality of internal states, and to finally determine the variation in the charging current based on the determined variations for each of the plurality of internal states.

20. The battery charging apparatus of claim 16, wherein the processor is configured to determine whether a charging limit condition is satisfied during charging of the battery in the present charging operation, and configured to determine the variation in the charging current based on the internal state of the battery and the degradation condition, in response to the charging limit condition being satisfied.

21. A battery charging method comprising:
   determining, in a present charging operation, a final variation in a charging current to charge a battery based on a degradation condition of the battery and determined variations for each of a plurality of internal states of the battery in the present charging operation; and
   determining a charging current of a subsequent charging operation based on the final variation in the charging current in the present charging operation and the charging current in the present charging operation.

* * * * *